J. L. FOLLETT.
Universal Joint for Connecting Rotary Shafts.
No. 200,046. Patented Feb. 5, 1878.
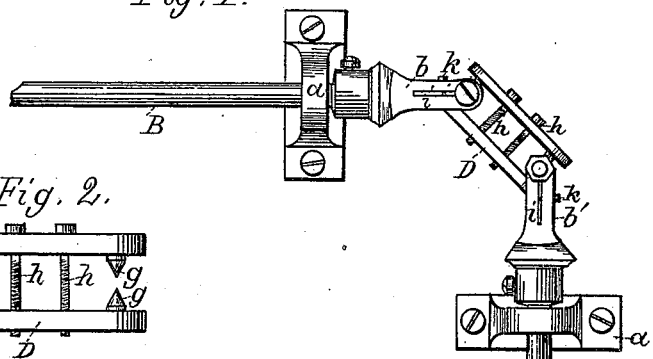
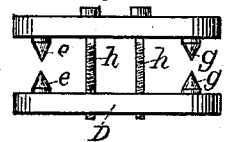
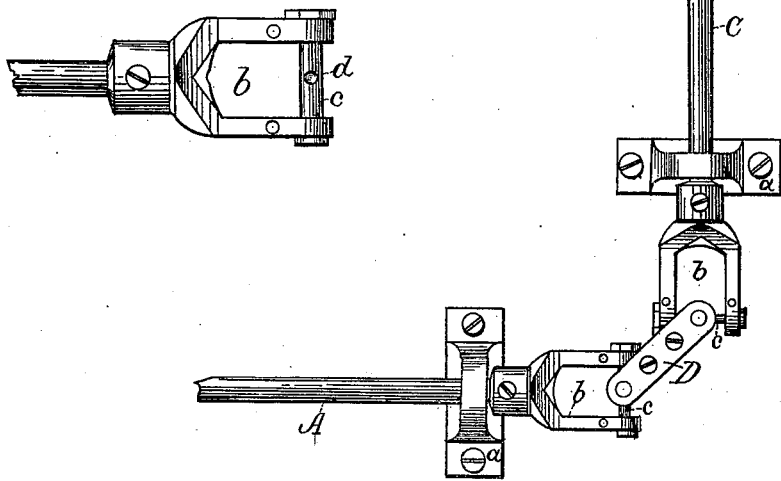

UNITED STATES PATENT OFFICE.

JOSEPH L. FOLLETT, OF NEW YORK, N. Y.

IMPROVEMENT IN UNIVERSAL JOINTS FOR CONNECTING ROTARY SHAFTS.

Specification forming part of Letters Patent No. 200,046, dated February 5, 1878; application filed January 23, 1878.

*To all whom it may concern:*

Be it known that I, JOSEPH L. FOLLETT, of the city, county, and State of New York, have invented certain new and useful improvements in means for connecting shafts placed at angles to one another, whereby a rotary motion may be transmitted from one shaft to another, of which the following is a specification:

My invention has been designed with particular reference to connecting parallel shafts in such manner that rotary motion from one shaft shall be communicated to the other. Parallel shafts have been so connected prior to my invention, as shown, for instance, in Letters Patent granted to James Baylor, July 19, 1859, No. 24,786.

My invention is directed to an improved construction and arrangement of the connections or universal joints through which motion is transmitted from one shaft to the next.

The nature of my invention and the manner in which the same is or may be carried into effect will be understood by reference to the accompanying drawing, in which—

Figure 1 is a side elevation of parallel shafts connected in accordance with my invention. Fig. 2 is a side elevation of one set of connecting-links with fixed centers. Fig. 3 is an elevation of one of the yokes that carry the rocking pins which are engaged by the fixed centers of the connecting-links.

The shaft that first receives rotary motion is marked A. The parallel shaft to which the motion is ultimately transmitted is marked B. C is the intermediate shaft, connecting at each end with the universal joints, which unite it on the one hand with shaft A, and on the other hand with shaft B. The several shafts A B C revolve in fixed bearings $a$.

To one end of shaft A is fixed a yoke, $b$, the forked end of which is formed with bearings to receive a pin, $c$, which can rotate in said bearings, but has no longitudinal play therein. This pin $c$, which I term the "rocking pin," inasmuch as it in practice has a rocking movement on its axis, is provided with two sockets, $d$, diametrically opposite one another, and designed to receive the fixed centers $e$, formed on the two links D. The two links are counterparts of one another, and are formed each with two centers, $e$ and $g$. The links are so positioned that the centers $e\ e\ g\ g$ come opposite to one another, the centers $e\ e$ entering the sockets $d$ in pin $c$, and the centers $g\ g$ entering like sockets formed in a like pin carried in a yoke, $b$, on the contiguous end of shaft C, similar in structure to the yoke $b$ on shaft A. Indeed, a description of one yoke and rocking pin and one set of links will answer for the several yokes, rocking pins, and links of the series of joints, inasmuch as they are identical in structure. I have, therefore, lettered like parts of the several joints with the same letters throughout.

The two links D of each joint are connected by screws or bolts $h$, by which they may be tightened or drawn together or adjusted, as occasion may require.

The bearings formed for the pins in the several yokes are split longitudinally, as shown at $i$, and are provided with screws $k$, or their equivalents, by which said bearings may be more or less tightened, as desired.

The joint between the shafts B C is the same as that already described between the shafts A C, and need not, therefore, be specifically described.

The shaft C is a mere intermediary between the shafts A B. The yokes on its ends are set in planes at right angles to one another, so that, for instance, when the rocking pin at one end is horizontal the pin at the other will be vertical. This, of course, necessitates a corresponding relation between the two sets of links, and also between the yokes carried by the shafts A and B.

Owing to the structure and arrangement of the connecting-links, the adjustment of the centers is made readily and easily, being effected by means of the screws $h$, which serve to adjust the centers equally and correctly— an arrangement much better on all accounts than if the centers $e\ e\ g\ g$ were adjustable separately, not only because the adjustment is obtained more expeditiously, but because, if the centers, instead of being fixed, are made separately movable, they are liable to work loose.

Further, I have only two centers, $e\ e\ g\ g$, at each extremity of the joint, employing in the place of the additional centers, which otherwise would become necessary, a rocking pin which has better and more solid bearings, and bearings which will not separate under the torsional strain to which the pin is subjected.

While my invention has been devised principally with a view to connecting parallel shafts, such, for instance, as are used in sewing-machines—the one shaft in the goose-neck, and the other below the plate of the machine—it is also applicable where the shafts are not parallel, or in any connection where shafts standing at an angle to one another require to be connected in such manner as to permit rotary motion to be transmitted from one to the other; and I wish it to be understood that I can apply it not alone to sewing-machines, but to any other machinery where shafts are placed at angles to one another.

Having described my invention, what I claim, and desire to secure by Letters Patent, is—

1. The combination of the two rocking pins, supported in bearings on the contiguous ends of the two shafts to be connected, with the intermediate links, adjustably connected or held together, and provided with fixed centers engaging sockets in the rocking pins, substantially as set forth.

2. The yokes formed with split or divided bearings, provided with tightening-screws and supporting rocking pins, as described, in combination with the intermediate adjustably-connected links, having fixed centers engaging the rocking pins, as set forth.

3. The two parallel shafts and the intermediate shaft, provided with rocking pins supported in bearings on said shafts, as described, in combination with the two sets of connecting-links, the links of each set being adjustably connected, and provided with fixed centers engaging the rocking pins, and the whole being arranged for joint operation, substantially as set forth.

In testimony whereof I hereunto subscribe my name in the presence of two witnesses.

JOSEPH L. FOLLETT.

Witnesses:
T. FRANCIS GIBBONS,
A. V. J. SMITH.